Patented Oct. 9, 1951

2,570,722

UNITED STATES PATENT OFFICE 2,570,722

PRODUCTION OF THIOPHENE COMPOUNDS FROM A SULFUR DIOXIDE AND HYDROGEN SULFIDE MIXTURE

William F. Sager, Cambridge, Mass., assignor to The Texas Company, New York, N. Y., a corporation of Delaware No Drawing. Application April 1, 1947,
Serial No. 738,741

11 Claims. (Cl. 260—332.8)

This invention relates to an improved process for the preparation of heterocyclic sulfur compounds and particularly to an improved process for the production of thiophene and its homologs.

Heterocyclic sulfur compounds such as those containing a thiophene nucleus have in the past been primarily of academic interest due to the uneconomical and difficult methods used in the preparation thereof. Recent developments, however, have shown that thiophene and its homologs may be synthesized by methods which involve the use of economical charge stocks and are easily adaptable to commercial operation. These two commercially feasible methods comprise the catalytic reaction of sulfur dioxide with aliphatic hydrocarbons and the catalytic reaction of hydrogen sulfide with aliphatic hydrocarbons. These reactions are conducted in the vapor phase and in the presence of a surface-active type of catalyst.

Although these specific methods represent a major advance over the prior techniques, their commercial adaptation is attended by certain operating difficulties which are characteristic of the individual processes. However, it has now been found that these difficulties can be avoided while at the same time retaining the advantageous features of each of the processes by conducting the synthesis reaction with a combination of the sulfur reactants as the sulfur charge.

The improved process of the invention involves broadly the vapor phase reaction of an organic compound containing an aliphatic chain of at least two carbon atoms with a mixture of a sulfur oxide and hydrogen sulfide in the presence of a surface-active catalyst. A volatile, thermally labile sulfide may be used in place of or in addition to hydrogen sulfide.

The process of the invention is similar to the two commercially feasible processes which have been referred to heretofore in that it comprises a vapor phase heterocyclization of a hydrocarbon to thiophene or a thiophene derivative in the presence of a surface-active type of catalyst. The subject process, however, is distinguished from the previously disclosed processes by the composition of its sulfur charge, which term is used to designate that portion of reactants containing sulfur in the combined state; a mixture of sulfur dioxide and hydrogen sulfide constitutes the sulfur portion of the charge in this process, as contrasted with the previously disclosed processes in which sulfur dioxide alone or hydrogen sulfide alone constitutes the sulfur charge.

The advantages derived from employing a mixture of sulfur dioxide and hydrogen sulfide to prepare thiophene derivatives by reaction with a hydrocarbon rather than employing a sulfur charge comprising essentially sulfur dioxide or essentially hydrogen sulfide are numerous. However, the most important advantage is increased activity. The yield of thiophene based on the amount of hydrocarbon charge increases substantially over the yield that would be expected by correlating the yields obtained employing a sulfur charge comprising essentially hydrogen sulfide and a sulfur charge comprising essentially sulfur dioxide with the percentage composition of the $H_2S+SO_2$ mixture employed as the sulfur charge herein.

Other important advantages accrue from the process of this invention which may be briefly delineated as follows: First, the desired reaction temperature is easily maintained within prescribed optimum conditions since the reaction is not highly exothermic; secondly, the reaction is not critical to catalyst as will be evident from the large number of possible catalysts which will be hereafter referred to in more detail; thirdly, catalyst life, as measured by duration of process period, is substantially increased when using a mixture of $H_2S+SO_2$ as contrasted with the catalyst life when employing a sulfur charge comprising essentially $H_2S$ which is a refinery by-product; fourthly, the catalyst used with the $H_2S+SO_2$ sulfur charge of this invention is readily regenerated to a sustained high level of activity even after many cycles of reaction and regeneration.

The process of the invention is especially applicable to the production of thiophene itself or to thiophene compounds possessing acyclic substituents. The type of thiophene compounds produced by the reaction process is dependent to a large extent on the choice of charge stock used in the reaction. To produce either thiophene or a thiophene derivative containing an acyclic constituent, the charge material is preferably a saturated or unsaturated acyclic hydrocarbon having at least two aliphatic carbon atoms in a chain or a mixture of organic compounds containing a substantial proportion of hydrocarbons of this type. Low molecular weight aliphatic hydrocarbons, such as are produced from the processing of petroleum or natural gas, constitute suitable charge stocks for the preparation of thiophene and lower acyclic homologs. When acyclic hydrocarbons containing more than 4 carbon atoms are used in the reaction, acyclic homologs of thiophene, containing one or more side chains, are the predominant product. There appears to be no upper limit on the chain length of the hydrocarbons employed for the charge stock with the exception that the hydrocarbons should be in the vapor form under the reaction conditions. When relatively simple reaction products are desired, however, it is advisable to employ a charge stock containing predominant amounts of hydrocarbons containing from 4 to 10 carbon atoms.

The process also includes the use of compounds other than acyclic hydrocarbons as the charge stock. There may be employed substituted acyclic hydrocarbons containing at least two aliphatic carbon atoms in a chain in which the substituents either remain attached to the acyclic hydrocarbon during the reaction, or are removed during the reaction to form compounds which do not have a substantially adverse effect on the reaction. Examples of such substituted acyclic hydrocarbons are halogenated aliphatic hydrocarbons such as chlorobutane and saturated or unsaturated aliphatic alcohols having at least two carbon atoms in the chain such as butyl alcohol. There may also be employed as a charge stock cyclic compounds in which there is attached to the cyclic nucleus an acyclic aliphatic side chain containing at least two carbon atoms. Aryl-substituted acyclic hydrocarbons such as ethyl, propyl or butyl benzene or corresponding derivatives of naphthalene constitute examples of this class of compounds which can be used as the charge stock to produce thiophene derivatives. Cycloaliphatic compounds such as cyclopropane and cyclobutane in which the cyclic nucleus is unstable at elevated temperatures may also be used as the charge stock.

As has been pointed out heretofore, the distinguishing feature of this invention, as compared with previously disclosed methods of thiophene production, is the composition of the sulfur charge to the heterocyclization process. A mixture of sulfur oxide and hydrogen sulfide constitutes the sulfur charge in the present invention. Since hydrogen sulfide is available as a waste gas from refinery operations, it ordinarily constitutes the major portion of the $H_2S+SO_2$ mixture merely on the basis of economic considerations.

It is feasible to substitute, in whole or in part, for the $H_2S$ portion of the mixture a volatile thermally labile sulfide. It is preferred, of course, to use hydrogen sulfide but it may be replaced by other sulfides which are volatile and thermally labile under the conditions of reaction including organic and inorganic sulfides, hydrosulfides and polysulfides which are decomposed to hydrogen sulfide and/or sulfur under reaction conditions. Metal sulfides are excluded from the inorganic sulfides which may be used since they decompose to non-volatile metallic constituents which tend to deposit on the catalytic surfaces and destroy catalyst activity. Thus only the non-metal and metalloid inorganic sulfides are included within the scope of inorganic volatile thermally labile sulfides; examples of such are ammonium sulfide, ammonium hydrosulfide and ammonium polysulfide. Useful volatile thermally labile organic sulfides include the aliphatic mercaptans and sulfides, particularly those containing a tertiary carbon atom; ethyl mercaptan, ethyl sulfide, tertiary butyl mercaptan and tertiary butyl sulfide illustrate the organic members of this class.

Although in general either sulfur dioxide or sulfur trioxide or a mixture thereof can be used as the sulfur oxide component for sulfur charge, sulfur dioxide is preferably used in admixture with hydrogen sulfide. The oxides are usually employed in a free state but they may be employed in the combined form such as in the form of their hydrates. Sulfur oxide hydrates, for example, decompose at the temperature of reaction to yield sulfur oxide and steam, which latter serves as a diluent in the reaction mixture.

It appears to make little difference from the viewpoint of either yield of thiophene or catalyst life whether the reactants are preheated separately or in admixture prior to their introduction into the catalytic zone. This point will be brought out in the examples which will be presented hereafter to illustrate the invention. The sulfur oxide portion of the sulfur charge ordinarily comprises about 15 to 55 mol per cent of the total sulfur charge; however, the sulfur oxide content of the sulfur charge may be present in either smaller or greater mol per cent than the indicated preferred range.

The heterocyclization reaction of the invention is conducted in the presence of a solid contact catalyst which may be described chemically as a solid contact material of the class of oxides and sulfides which are stable under the conditions of reaction. Such catalysts include metal oxides such as molybdena which, under the conditions of reaction, may undergo conversion to the corresponding sulfide. It is recognized that certain of the materials classified as catalysts for the subject reaction are relatively inert catalytically as applied to conventional hydrocarbon conversion reactions. Selection of the particular catalyst to be used would depend to a large extent upon the choice of charge stock used in the reaction. The solid contact catalysts usually preferred for general application with a majority of economical charge stocks are the solid, acid-reacting catalysts such as amphoteric metal oxides and sulfides which are stable under reaction conditions, silica, etc.

Specific examples of the catalysts contemplated for use in the invention are oxides of aluminum, chromium, vanadium, molybdenum, titanium, magnesium, boron and silicon, and sulfides of nickel, tungsten, cobalt, tin, etc., as well as mixtures of chemical combinations thereof such as silica-alumina, acid-treated bentonitic clays, etc.

The familiar class of dehydrogenation catalysts are included within the general classification of solid acid-reacting contact catalysts and are preferred catalysts for the process of this invention. Suitable dehydrogenation catalysts are the oxides and stable sulfides of the metals of group VI of the periodic table. Specially preferred dehydrogenation catalysts are chromia-alumina, molybdena-alumina and molybdenum sulfide-alumina catalysts.

In carrying out the process of the invention, the reactants in vapor form are introduced into a reaction chamber containing a solid contact catalyst maintained at the desired reaction temperature. The catalytic reaction zone may either be a fixed bed type or a fluid type in which latter type operation the catalyst is maintained in powder form in a turbulent state.

It is evident the process may be operated in accordance with any of the usual techniques for high temperature catalytic conversions. Thus, fixed catalyst beds may be used in alternate reaction and regeneration cycles; fluid catalyst operation may be used wherein catalyst is continuously withdrawn from the catalyst zone, regenerated and reintroduced into the catalyst zone after regeneration; fluidized fixed bed operation may also be used in which the catalyst particles remain in the reaction zone during alternate reaction and regeneration cycles; stirred catalysts beds as well as moving catalysts beds of the Thermofor type are other possible alternatives.

It will be recognized that the conditions of reaction will vary in accordance with the particular reactants and catalyst employed, as well as the type of process technique. As a general proposition, however, temperatures of at least 700° F., a space velocity of about 0.1 to 10.0, wherein space velocity defines the weights of hydrocarbon per hour per weight of catalyst, and a mol ratio of $H_2S+SO_2$ sulfur mixture to hydrocarbon within the range of 0.1 to 10.0 are preferred in the majority of reactions.

The particular conditions of reaction are best illustrated by reference to conditions involved in the reaction of an unsaturated acyclic hydrocarbon, such as butylene, over 100 to 200 mesh chromia-alumina catalyst employing a fluidized fixed bed type of process technique. When charging butylene-2 over a chromia-alumina catalyst, the space velocity advantageously falls within the range of 0.5 to 5.0; the mol ratio of $H_2S+SO_2$ mixture to butylene-2 preferably lies within the range of 1.0 to 4.0; the temperature in the fluidized catalyst zone is maintained between about 700 to about 1400° F. and preferably between 950 to 1,200° F. It is to be understood that the specific conditions described as optimum are those which result in optimum yields of thiophene in a single pass operation. Where a continuous recycle process is used, it may be desirable to modify these conditions of reaction in order to obtain an optimum ultimate yield of the desired product.

The process period for optimum thiophene production will depend to some extent upon the charge stock and the reaction conditions employed, but will generally be of longer duration than one hour. In any case, periodic determination of thiophene yields will indicate the practical period of catalyst activity before regeneration. When the thiophene yields are found to fall off sharply, the catalyst may be then regenerated by conventional methods, such as regeneration with air at about 1,000° F., which methods are typical of the type of catalyst technique employed.

Thiophene compounds produced by the reaction may be recovered from the reaction products in accordance with conventional methods of recovery. For example, the reaction products containing unreacted charge stocks, sulfur, cracked products of the charge stock, diolefinic compounds, unreacted sulfur dioxide and hydrogen sulfide may be passed through a caustic soda solution to dissolve the acid gases. If the caustic soda solution is maintained cold, the thiophene will condense as a supernatant layer. The thiophene layer can be drawn off therefrom and distilled. If the caustic soda solution is maintained hot, the thiophene compounds will steam distill from the caustic solution and can then be separated from the water layer and purified by distillation.

The thiophene compounds may also be recovered in crude form by a simple condensation procedure which involves passing the products into a cool body of hydrocarbon oil, such as kerosene, in which the thiophene compounds will condense; thiophene compounds can later be recovered from the condensing oil by distillation.

The process of the invention may be further illustrated by the following specific examples:

Example I

Butylene-2, hydrogen sulfide and sulfur dioxide were passed in vapor phase at a temperature of about 1,110° F. through a fluidized mass of catalyst confined within a vertical reaction zone, the catalyst amounting to about 500 grams and consisting of a mixture of chromic oxide and aluminum oxide, containing 12% $Cr_2O_3$ by weight, in powdered form of about 100 to 200 mesh.

The hydrocarbon and hydrogen sulfide were mixed to form one reactant stream and continuously charged at the hourly rate of about 506 grams and 454 grams, respectively, while the sulfur dioxide formed a separate reactant stream which was charged at the rate of about 353 grams per hour. The two streams were separately preheated in the vapor phase to about 1,100° F. prior to introduction to the reaction zone. The hydrocarbon space velocity through the reaction zone expressed as weight of hydrocarbon per hour per weight of catalyst was about 1.0. The catalyst was maintained on stream for a period of 80 minutes without reactivation. Crude thiophene of about 95% purity and in the amount of about 483 grams was obtained, this yield representing a conversion of about 71.5 grams of crude thiophene per 100 grams of butylene-2 charged.

Example II

Butylene-2, hydrogen sulfide and sulfur dioxide were passed in vapor phase at a temperature of about 1,101° F. through a fluidized mass of catalyst confined within a vertical reaction zone, the catalyst amounting to about 500 grams and consisting of a mixture of chromic oxide and aluminum oxide, containing 12% $Cr_2O_3$ by weight, in powdered form of about 100 to 200 mesh.

The hydrocarbon, hydrogen sulfide and sulfur dioxide were mixed to form one reactant stream and the mixture of reactants was preheated in the vapor phase to about 1,100° F. prior to introduction to the reaction zone. The hydrocarbon, hydrogen sulfide and sulfur dioxide were charged to the reaction zone at an hourly rate of about 506 grams, 454 grams and 353 grams respectively. The hydrocarbon space velocity through the reaction zone expressed as weight of hydrocarbon per hour per weight of catalyst was about 1.0. The catalyst was maintained on stream for a period of 80 minutes without reactivation. Crude thiophene of about 95 purity and in the amount of about 448 grams was obtained, this yield representing a conversion of about 70 grams of crude thiophene per 100 grams of butylene-2 charged.

It will be understood, of course, that these examples are merely illustrative of the preferred embodiment of the invention and that other catalysts, charge stocks and conditions of reaction may be employed in accordance with the previous description. By using other selected hydrocarbon charge stocks, thiophene compounds containing various substituents may be produced by the present process. Thus, other acyclic hydrocarbons containing two or more carbon atoms may be employed to produce thiophene itself or thiophene compounds containing acyclic substituents in which the number of carbon atoms in the side chain is dependent on the number of carbon atoms in the hydrocarbon charge. Further, other organic compounds containing an acyclic aliphatic chain of two or more carbon atoms may be employed to produce a variety of compounds containing a thiophene nucleus.

Obviously many modifications and variations of the invention, as hereinbefore set forth, may be made without departing from the spirit and scope thereof and, therefore, only such limitations should be imposed as are indicated in the appended claims.

I claim:
1. A process for the preparation of heterocyclic sulfur compounds containing a thiophene nucleus, which comprises passing a mixture of sulfur dioxide and hydrogen sulfide and an organic compound selected from the group consisting of hydrocarbons, alcohols and monohalo hydrocarbons containing an aliphatic chain of at least 2 carbon atoms at a space velocity less than 10 weights of organic compound per hour per weight of catalyst into a reaction zone containing a particulate surface-active catalyst, reacting said organic compound and said mixture of sulfur dioxide and hydrogen sulfide in the vapor phase at a space velocity less than 10 weights of organic compound per hour per weight of catalyst and at a temperature of at least 700° F. to form said heterocyclic compound, and removing from said reaction zone products of reaction containing said heterocyclic compound in substantial amount.

2. A process according to claim 1 in which the mixture of sulfur dioxide and hydrogen sulfide contains predominant amounts of hydrogen sulfide.

3. A process according to claim 1 in which the reactants are passed into the reaction zone at a space velocity between 0.1 and 10 weights of organic compound per hour per weight of catalyst.

4. A process according to claim 1 in which the reaction is effected at a temperature between 700 and 1400° F.

5. A process for the preparation of heterocyclic sulfur compounds containing a thiophene nucleus, which comprises passing a mixture of hydrogen sulfide and sulfur dioxide and a hydrocarbon containing an aliphatic chain of at least 2 carbon atoms into a reaction containing a particulate surface-active catalyst, reacting said mixture of hydrogen sulfide and sulfur dioxide and said hydrocarbon in the vapor phase at an elevated temperature between 700 and 1400° F. and at a space velocity less than 10 weights of hydrocarbon per hour per weight of catalyst and removing from said reaction zone products of reaction containing said heterocyclic compound in substantial amount.

6. A process according to claim 5 in which there is employed a space velocity of 0.1 to 10 weights of hydrocarbon per hour per weight of catalyst.

7. A process according to claim 5 in which the mol ratio of sulfur dioxide plus hydrogen sulfide to hydrocarbon is at least 0.1.

8. A process according to claim 5 in which the mol ratio of sulfur dioxide plus hydrogen sulfide to hydrocarbon is between 1.0 and 4.0.

9. A process according to claim 5 in which sulful dioxide comprises approximately 50 to 55 mol per cent of the over-all mixture of hydrogen sulfide plus sulfur dioxide.

10. A process according to claim 5 in which the catalyst comprises a group VI metal oxide on a surface-active material.

11. A process according to claim 5 in which the catalyst comprises a group VI metal sulfide on a surface-active material.

WILLIAM F. SAGER.

REFERENCES CITED

The following references are of record in the file of this patent:

UNITED STATES PATENTS

| Number | Name | Date |
|---|---|---|
| 1,085,708 | Steinkopf | Feb. 3, 1914 |
| 2,126,817 | Rosen | Aug. 10, 1938 |
| 2,161,991 | Baehr | June 13, 1939 |
| 2,370,513 | Arnos | Feb. 27, 1945 |
| 2,418,374 | Stone | Apr. 1, 1947 |
| 2,428,727 | Thacker | Oct. 7, 1947 |